H. F. PRICE.
CERTIFICATE OF DEPOSIT.
APPLICATION FILED NOV. 5, 1914.

1,172,554.

Patented Feb. 22, 1916.
2 SHEETS—SHEET 1.

Fig. 1

Number
000

4 Per Cent.
Mail Certificate

THE PUTNAM TRUST COMPANY
OF GREENWICH CONNECTICUT

This is to certify that ........................................................
of ........................... has deposited with The Putnam Trust Company
of Greenwich Connecticut, the sum of ........................... Dollars
on which interest will be allowed at the rate of 4 per cent. per
annum and on subsequent deposits in current funds to the credit of this
certificate as noted below, the receipt of which is attested to by the signature
of an officer of this Company, it being further understood and agreed that
the aforesaid amounts which are or shall be credited to this certificate
will draw interest from the first of the month in which they are deposited
when received by the Company in current funds during banking hours,
before or on the third day of that month; otherwise the interest shall
commence from the first day of the following month; that all withdraw-
als on account of this certificate shall be made in the following manner;
By noting on one of the attached coupons in numerical order the amount
of such withdrawal dated and signed by the holder hereof and the
mailing of this certificate to the Company at its address in Greenwich
with the filled out and signed coupon attached.

The Company on receipt of this certificate with the undetached coupon
properly filled out and signed, will detach the coupon, holding it as a
voucher for the payment which will be endorsed on the certificate
with number and date of coupon, mailing its check for the amount
of the payment on the ........................... of ........................... to the order
of the registered holder of this certificate with certificate attached to
the address given above.

Interest on the amount of all withdrawals shall cease from the first
of the month in which they are withdrawn. The Putnam Trust Company

CREDITS

| DATE | AMOUNT | PRINCIPAL | INTEREST | ATTESTED |
|------|--------|-----------|----------|----------|
|      |        |           |          |          |

Witnesses:

Anna R. Fenton
Harry Frost

Inventor
Henry F. Price
By Dyer & Taylor
Attorneys.

THE COLUMBIA PLANOGRAPH CO., WASHINGTON, D. C.

H. F. PRICE.
CERTIFICATE OF DEPOSIT.
APPLICATION FILED NOV. 5, 1914.

1,172,554.

Patented Feb. 22, 1916.
2 SHEETS—SHEET 2.

Witnesses:

Inventor
Henry F. Price
By Dyer & Taylor
Attorneys.

UNITED STATES PATENT OFFICE.

HENRY F. PRICE, OF RIVERSIDE, CONNECTICUT, ASSIGNOR TO THE PUTNAM TRUST COMPANY, OF GREENWICH, CONNECTICUT, A CORPORATION OF CONNECTICUT.

CERTIFICATE OF DEPOSIT.

1,172,554.      Specification of Letters Patent.      Patented Feb. 22, 1916.

Application filed November 5, 1914. Serial No. 870,374.

*To all whom it may concern:*

Be it known that I, HENRY F. PRICE, a citizen of the United States, residing at Riverside, town of Greenwich, county of Fairfield, State of Connecticut, have invented a new and useful Certificate of Deposit, of which the following is a specification.

This invention relates to commercial instruments, generally known as certificates of deposit, serving as evidence of the business done between a depositor and a bank.

The objects of the invention are: First: To combine within a single instrument all the necessary media to permit the proper entry and withdrawal of deposits by mail without the necessity of pass books, deposit slips, check books, letters of instruction, or other means to inform the bank of the intentions of the depositor. Second: To render the certificate non-negotiable, except by the knowledge and consent of the bank, so that in the event the certificate is lost or stolen, a new certificate may be issued by the bank and neither the depositor nor the bank will suffer loss. Third: To provide means for showing the exact balance on deposit without the need of rendering a statement by the bank.

These and further objects will more fully appear from the following specification and accompanying drawings, considered together or separately.

In the drawings, Figure 1 represents one face of an instrument embodying my invention; and Fig. 2 represents the other face of the same, only one withdrawal form being illustrated as having matter printed thereon.

In both views like parts are designated by the same reference characters.

The instrument comprises the certificate 1 to record deposits and a plurality of withdrawal forms 2 to provide for withdrawals. As shown in the drawings, in the particular embodiment chosen for illustration, these two parts of the instrument are printed upon a single sheet of paper. For convenience, each is made the same size. For further convenience, the sheet is folded along the line 3 so that the sheet of withdrawal forms will lie behind the certificate. Both certificate and form sheet may be folded along the broken lines appearing in the drawing, so that it may be inclosed in an envelop.

On the face of the certificate appears printed matter which will serve as instructions to a depositor. This printed matter may also be combined with a contract by the bank to credit the depositor with deposits and interest and to permit withdrawals. At a suitable place, as at 4, is a space for the record of the name of the depositor. At a suitable place, as at 5, is a space for the record of the address of the depositor. At a suitable space, as at 6, is entered a record of the amount of money originally deposited and for which the certificate of deposit is issued. At the space 7 is entered the name of the bank or trust company upon which the check for payment of the money withdrawn will be payable and at the space 8 is entered the address of such bank. At the space 9 will appear the signature of the officer of the bank signing the contract. The face of the certificate will bear a suitable designating number, as at 10, it being understood that the certificates issued by a bank will be usually serially numbered so that a convenient record of them may be kept.

In connection with the descriptive and contractual matter just described, on the certificate appears a space 11 for the entry of deposits made by the depositor after the certificate has been issued to him. The space 11 will contain columns for the date of deposit, amount of deposit, and columns for record of additional principal and entry of interest, with a further column for the signature of an officer of the bank.

The first step to be taken by a prospective depositor in opening an account by mail will be to send to the bank a check or currency of the amount of the initial deposit, together with a signature card, containing the street and house address of the depositor. The bank will then send the depositor a certificate, with the name and address of the depositor, and the sum of the deposit recorded thereon, the certificate being signed by an officer of the bank.

In order to deposit additional money after a certificate has been issued, it is but necessary for the depositor to transmit the certificate to the bank (usually by mail) and accompany the certificate with a check or currency for the amount to be deposited. This can conveniently be done by mail without the need of writing a letter, as the certificate and check or currency may be inclosed in an envelop and addressed to the bank. When received by the bank, the amount deposited will be entered in the appropriate column in the space 11, together with the date, and in the appropriate column the principal at that date will be recorded, and the whole attested to by an officer of the bank who will sign in the appropriate column. The certificate may then be returned to the depositor (usually by mail).

It is to be understood that the space 11 is not essential, as a complete and workable certificate of deposit, payable up to a certain sum indicated upon its face, without the provision for entry of additional deposits, may be used, but the arrangement described is of greater utility.

On the opposite face of the certificate is shown a space 12. In suitable columns will be places for the dates and the amounts of withdrawals. These columns may be horizontally ruled, as shown, and in the appropriate column may appear numbers serially arranged so that each transaction of a withdrawal of money will receive a serial number.

In connection with the certificate thus described, is employed the sheet of withdrawal forms 2 to provide a means for withdrawing money. These forms are arranged so that they may be separately detached. Each form is preferably numbered serially in the order in which they will be detached, thus, as shown in Fig. 2, forms numbered 1, 2 and 3 are on the outer edge and will be the first detached. In the embodiment of the invention chosen for illustration, each form contains the following matter, viz:

THE PUTNAM TRUST COMPANY
OF GREENWICH, CONN.

Remit check on New York to my order to address registered with you and charge to certificate No. 000.

It is to be understood that each form has the same matter printed upon it.

On the form is a space 13 for the entry of the sum of money which is to be withdrawn. A space 14 is provided for the date, if such is desired. A space 15 contains the number of the certificate, such number being the same as that in the space 10 in Fig. 1. Another space, at 16, is for the signature of the depositor. In withdrawing money, the depositor will write on the form having the lowest serial number, the amount of money he desires to withdraw, together with the date and will sign his name to the form. He will then transmit the certificate to the bank without removing the form. The bank will then remove the form and retain it as a voucher for the payment of the sum of money recorded thereon. The bank will also enter in the appropriate column 12 in line with the number which the serial number of the form bears, the amount withdrawn, together with the date thereof. The bank will then return the certificate to the depositor together with a check for the amount withdrawn, payable to the order of the depositor, the said check being drawn upon the bank whose name and address appears in the spaces 7 and 8, Fig. 1, this latter bank having sufficient funds of the bank which issues the certificate to pay the same.

It is apparent that my improved certificate of deposit has many advantages, particularly in banking by mail. The depositor in depositing or withdrawing money at a distance is not bothered with the necessity of writing a letter or transmitting a pass book, or filling out a deposit slip. As described, if he wishes to deposit money it is but necessary to send it to the bank with the certificate and the bank will credit the amount to him, without further instructions. If he wishes to withdraw money, it is but necessary to fill in and sign a withdrawal form and send the certificate of deposit to the bank. It is unnecessary for the bank to write a letter to the depositor, as the certificate being accompanied by a check for the amount of the withdrawal, is sufficient to complete the transaction. The depositor will record his signature and address with the bank so that the bank will be able to compare the signature on the withdrawal form with the signature on the record which it has and the bank will also have a record of the street and home address of the depositor so that the certificate and checks of withdrawal may be mailed to him. In the event of loss of the certificate another may be issued, the certificate being non-negotiable except with the consent and knowledge of the bank.

One advantage of the device is that it can be made sufficiently light to be inclosed in an envelop with its return envelop and check, and be transmitted in the mail for a two-cent stamp. As the certificate is not negotiable, in the event of loss, a duplicate can be issued, the certificate simply being evidence of the amount of money that the depositor has to his credit in the bank. As the only way that money is drawn out is through checks payable to the order of the holder of the certificate whose name appears upon it, if the certificate falls into the hands of a stranger he cannot derive any benefit from it, as any money drawn out will be through a check to the order of the original owner of the certificate.

In the preceding specification and accompanying claims, I use the term "bank" as meaning the individual or institution doing business with the depositor. It is, of course, to be understood that any kind of a bank, trust company or private banker is intended to fall within this term. The particular matter appearing upon the face of the certificate is shown solely for the purpose of illustration, it being understood that the matter will be varied in accordance with the particular use to which the instrument is to be put.

The interest on the amount of money to the credit of the depositor may be recorded semi-annually, or at such times as are convenient, in the appropriate column in the space 11.

The third object of the invention, whereby the exact balance on deposit is shown without the need of rendering a statement by the bank, is attained by the record of payments and deposits noted on the certificate thus making unnecessary the rendering of a statement by the bank or the return of the vouchers.

The certificate is made non-negotiable for the reason that no withdrawals can be made against it except by the signature of the registered holder on one of the withdrawal forms and then only in the form of a check to the registered holder's order.

In accordance with the provisions of the patent statutes, I have described the principle of my invention, together with the apparatus which I now consider to represent the best embodiment thereof, but I desire to have it understood that the apparatus shown is merely illustrative and that the invention may be carried out in other ways.

Having now described my invention, what I claim as new and desire to secure by Letters Patent, is:

1. A certificate of deposit, comprising a sheet carrying the certificate and being suitably printed to provide for the entry of a sum of money and the entry of the name of the owner of the certificate, and having a plurality of detachable withdrawal forms, each being suitably printed to provide for the entry of a sum of money and the entry of the name of the owner, and bearing directions to the bank to remit a check to the owner of the certificate drawn to his order said forms being adapted to be signed by the owner and to be removed by the bank and retained as a voucher for the payment of the sum entered on the form.

2. A certificate of deposit, comprising a sheet carrying the certificate and being suitably printed to provide for the entry of a sum of money and the entry of the name of the owner of the certificate, said sheet also having a certain designating number, and having a plurality of detachable withdrawal forms, each being suitably printed to provide for the entry of a sum of money and the entry of the name of the owner, and bearing directions to the bank to remit a check to the owner of the certificate drawn to his order each form bearing the same designating number as appears upon the certificate, said forms being adapted to be signed by the owner and to be removed by the bank and retained as a voucher for the payment of the sum entered on the form.

3. A certificate of deposit, comprising a sheet carrying the certificate and being suitably printed to provide for the entry of a sum of money and the entry of the name of the owner of the certificate and having a plurality of detachable withdrawal forms, each being suitably printed to provide for the entry of a sum of money and the entry of the name of the owner, and bearing directions to the bank to remit a check to the owner of the certificate drawn to his order and each form bearing a number, said numbers being serially arranged in the order in which the forms are detachable, said forms being adapted to be signed by the owner and to be removed by the bank and retained as a voucher for the payment of the sum entered on the form.

4. A certificate of deposit, comprising a sheet carrying the certificate and being suitably printed to provide for the entry of a sum of money and the entry of the name of the owner, said sheet also having a certain designating number, and having a plurality of detachable withdrawal forms, each being suitably printed to provide for the entry of a sum of money and the entry of the name of the owner, and bearing directions to the bank to remit a check to the owner of the certificate drawn to his order each form bearing the same designating number as appears upon the certificate, and each form bearing a number, said numbers being serially arranged in the order in which the forms are detachable, said forms being adapted to be signed by the owner and to be removed by the bank and retained as a voucher for the payment of the sum entered on the form.

This specification signed and witnessed this second day of November, 1914.

HENRY F. PRICE.

Witnesses:
W. H. BRETTMAN,
A. B. STANTON.

Copies of this patent may be obtained for five cents each, by addressing the "Commissioner of Patents, Washington, D. C."